(12) United States Patent
Esala et al.

(10) Patent No.: US 11,385,209 B2
(45) Date of Patent: Jul. 12, 2022

(54) CHROMATOGRAPHY CARTRIDGE AND METHOD OF PRODUCTION THEREOF

(71) Applicant: Biotage AB, Uppsala (SE)

(72) Inventors: Juha Esala, Vattholma (SE); Andreas Norlen, Bergshamra (SE); Per Normann, Uppsala (SE)

(73) Assignee: Biotage AB, Uppsala (SE)

( * ) Notice: Subject to any disclaimer, the term of this patent is extended or adjusted under 35 U.S.C. 154(b) by 175 days.

(21) Appl. No.: 16/643,627

(22) PCT Filed: Aug. 29, 2018

(86) PCT No.: PCT/EP2018/073215
§ 371 (c)(1),
(2) Date: Mar. 2, 2020

(87) PCT Pub. No.: WO2019/043050
PCT Pub. Date: Mar. 7, 2019

(65) Prior Publication Data
US 2020/0400624 A1 Dec. 24, 2020

(30) Foreign Application Priority Data
Sep. 1, 2017 (EP) .................................. 17189076

(51) Int. Cl.
*G01N 30/60* (2006.01)
*B01D 15/16* (2006.01)
*G01N 30/02* (2006.01)

(52) U.S. Cl.
CPC ....... *G01N 30/6004* (2013.01); *B01D 15/165* (2013.01); *G01N 30/6052* (2013.01); *G01N 30/6091* (2013.01); *G01N 2030/027* (2013.01)

(58) Field of Classification Search
CPC .......... G01N 30/6004; G01N 30/6052; G01N 30/6091; G01N 2030/027; B01D 15/165
See application file for complete search history.

(56) References Cited

U.S. PATENT DOCUMENTS

| 9,114,335 B1 | 8/2015 | Cao et al. |
| 2006/0011532 A1 | 1/2006 | Van Davelaar et al. |

(Continued)

OTHER PUBLICATIONS

International Search Report PCT/ISA/210 for International Application No. PCT/EP2018/073215 dated Nov. 20, 2018.

*Primary Examiner* — Benjamin L Lebron
(74) *Attorney, Agent, or Firm* — Harness, Dickey & Pierce, P.L.C.

(57) ABSTRACT

The present invention relates to a pre-packed chromatography cartridge (10) suitable for flash chromatography. The chromatography cartridge (10) comprises a barrel (20) having one end sealed with a cap (40), a thread (23) arranged on the outer cylindrical surface of the barrel (20) and engaged to a mating thread (43) on the inner cylindrical surface of the cap (40). The barrel is provided with at least one protrusion (24) arranged on the outer cylindrical surface and below the thread (23) in the direction from the end sealed by the cap (40). The protrusion (24) extends essentially radially outwards from the outer cylindrical surface of the barrel (20). The cap (40) is provided with a cylindrical flange (44) arranged below the thread (43) of the cap (40). A locking member (46) is arranged on the flange (44) and extends essentially radially inwards from the inner cylindrical surface of the flange (44). Together with the protrusion (24) of the barrel (20), the locking member (46) forms a mechanical connection that secures the cap (40) such that it cannot be unscrewed from the barrel (20).

15 Claims, 3 Drawing Sheets

(56) References Cited

U.S. PATENT DOCUMENTS

2006/0060535 A1    3/2006   Ellis et al.
2016/0228792 A1    8/2016   Rao et al.

Fig. 1 a-c a)
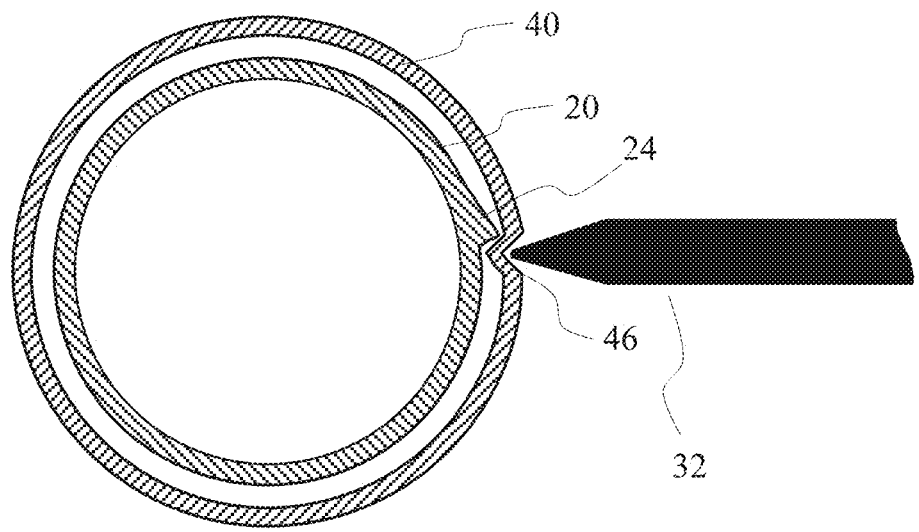
b)
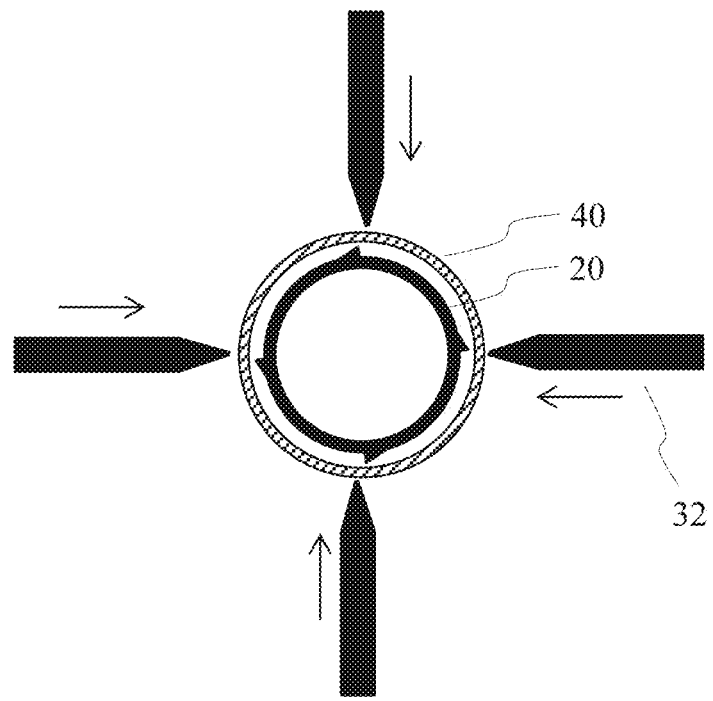
Fig. 3

CHROMATOGRAPHY CARTRIDGE AND METHOD OF PRODUCTION THEREOF

This application is a national phase under 35 U.S.C. § 371 of PCT International Application No. PCT/EP2018/073215, which has an International filing date of Aug. 29, 2018, which claims priority to European Patent Application No. 171890767, filed Sep. 1, 2017, the entire contents of each of which are hereby incorporated by reference.

FIELD OF THE INVENTION

The present invention relates to chromatography, and more particularly to a pre-packed chromatography cartridge suitable for high pressure as well as a method for the production of such a pre-packed cartridge.

BACKGROUND OF THE INVENTION

Chromatography is a chemical separation technique utilizing the fact that substances to be separated are distributed in different ways between a stationary phase and a mobile phase. The stationary phase, or separation medium, which typically is an adsorption medium, an ion-exchanger material, a gel or a surface-modified solid material, is usually packed in a column. Different components in a sample applied to the top of the medium bed will migrate through the column at different rates depending, e.g., on their size and degree of attraction to the stationary phase when the liquid passes through the column. Liquid chromatography is extensively used for chemical analysis as well as for preparative separations in research and industry.

In traditional chromatography, the liquid or solvent passes through the column by gravity. The rate at which the liquid passes through the column is therefore relatively slow. To speed up the rate of the chromatography process, the liquid is forced through the column by the application of a positive pressure. This may be accomplished by pumping the liquid through the column, such as in HPLC (high performance liquid chromatography), or by the application of a positive air-pressure, such as in flash chromatography. Modern flash chromatography typically uses plastic pre-packed disposable columns or cartridges and in most variants the liquid is pumped through the column or cartridge.

The disposable cartridges used for flash chromatography are usually manufactured with economy in mind, which involves manufacturing the cartridges of inexpensive plastics and designing the columns to be easily assembled by filling the body of the column with the desired packing, usually with frit plugs on each end of the packing to hold the packing in place, and then closing the open end or ends of the columns by end pieces or caps, e.g. by screwing or snapping them to the column ends. The end pieces may also be glued or welded to the column, for example by spin welding or heat plate welding. The modern flash chromatography puts high demands on the cartridges being leak tight and that this property is maintained throughout the process without requiring a delicate handling. Considerable efforts have been made to provide disposable cartridges that are suited for high volume manufacturing at a reasonable cost and yet are sufficiently rigid and leakproof.

The majority of cartridges for flash chromatography are provided to the end user as a closed pre-packed product. However for certain applications it is desirable to load the sample directly into the column or modify the column. For these purposes so called open cartridges are provided. Typically such cartridges are provided with a screw or snap cap. The demand for open cartridges forces the manufacturer to manufacture and store two separate types of cartridges, which is undesirable from an economic standpoint both from the perspective of handling and storing and that multiple moulds are needed for the production of the cartridges.

A further requirement of today is that the cartridges should be possible to re-cycle without costly measures. Re-cycling typically requires separating the packed material, at this staged typically containing residue liquids, from the plastic cartridge. The permanently closed cartridges, which are most common, are not well suited for efficient re-cycling.

SUMMARY OF THE INVENTION

The object of the invention is to provide a disposable cartridge for flash chromatography that overcomes the drawbacks of prior art cartridges and manufacturing techniques. This is achieved by the cartridge as defined in claim 1, the barrel as defined in claim 12, the kit as defined in claim 13, and the method of manufacturing the cartridge as defined in claim 14.

The chromatography cartridge according to the invention comprises a barrel having at least one end sealed with a cap, a thread arranged on the outer cylindrical surface of the barrel and engaged to a mating thread on the inner cylindrical surface of the cap being mounted onto the barrel. The barrel is provided with at least one protrusion arranged on the outer cylindrical surface and below the thread in the direction from the end sealed by the cap. The protrusion extends essentially radially outwards from the outer cylindrical surface of the barrel. The cap is provided with a cylindrical flange arranged below the thread of the cap in the direction from the inlet end. The flange should accommodate the protrusion or protrusions. At least one locking member is arranged on the flange and extends essentially radially inwards from the inner cylindrical surface of the flange. Together with the protrusion of the barrel, the locking member forms a mechanical connection that secures that the cap can not be unscrewed from the barrel, at least not with a force/torque that is achievable by a user using her bare hands.

According to one aspect of the invention the locking member is a local deformation of the flange and the local deformation has been provided to the flange after the cap has been mounted onto the barrel. The local deformation may for example be in the form of an indent which is a result of a punching operation onto the flange or a melted structure being a result of a local melting of the flange.

According to another aspect of the invention, the indent may, as a result of the punching operation, be at least partially plastically deformed. Preferably there is an overlap in the radial direction between the protrusion and the indent that exceeds half the length that the protrusion extends from the outer surface of the barrel. Preferably the indent is arranged after the protrusion in the screw direction and abuts the protrusion.

According to one aspect of the invention the mechanical connection formed by the protrusion and the locking member is arranged to withstand a first predetermined torque and to break at a second predetermined torque, the first and second predetermined torque asserted in the direction opposite to the screw direction, the direction of unscrewing the cap from the barrel. The first predetermined torque should relate to a torque achievable by a user using her bare hands to unscrew the cap and the second predetermined torque should be in the range 1.3-2 times the first predetermined torque. Hence, it should with a margin be ensured that a user without the aid of a tool or machinery can not open the cartridge. Yet it should be possible to, with suitable tool providing a lever or machinery, open the cartridge without complete demolition of the cartridge.

According to a further aspect a plurality of pairs of protrusions and locking members are provided on the barrel and the flange, respectively.

The barrel for a chromatography cartridge according to the invention, the barrel has at least one end arranged to be sealed with a cap, a thread arranged on the outer surface of the barrel and adapted to be engaged with a corresponding thread on the inner cylindrical surface of a cap. The barrel is provided with at least one protrusion arranged on the outer cylindrical surface and below the thread in the direction from the end adapted for being sealed by a cap. The protrusion extends essentially radially outwards from the outer cylindrical surface of the barrel and is adapted to form a mechanical connection with a locking member that extends essentially radially inwards from an inner cylindrical surface of a flange of the cap.

The method according to the invention of manufacturing a pre-packed chromatography cartridge comprising a barrel and a cap according to the above described, comprises the steps of:
  providing a barrel with at least chromatography media;
  positioning the barrel in a punching equipment comprising at least one punch and aligning the protrusion of the barrel so that the punch is positioned a predetermined distances after the protrusion in the screw direction;
  applying the cap to the top of the barrel;
  screwing the cap to a predetermined position and/or with a predetermined torque;
  punching the flange of the cap to produce at least one indent, and so that the indent after the punching operation will abut the protrusion.

According to one aspect, the method of the invention comprises, in the positioning step, mating alignment means provided on the barrel with corresponding alignment means provided on a support structure of the punching equipment.

According to one aspect of the invention of invention the punch depth/force of the punch is selected to give an indent that is at least partly plastically deformed.

According to another aspect the punching step comprises punching with a plurality of punches, each producing an indent, and wherein the punching with the plurality of punches is simultaneous in order to have a balanced operation.

Thanks to the invention a cartridge is provided wherein the same barrel can be used for both open and closed cartridges. The closed cartridges are locked as a last step, or one of the last steps, in the assembling process and in a manner that is cost effective and gentle to the media etc. in the packed cartridge.

One advantage of the invention is that the cartridge can be designed not to be opened by accident or by mistake or even if a user tries to open the cartridge by normal means. This ensures that the content of the cartridge is intact and that the chromatograph equipment is not damaged by incorrect use or that invalid or questionable results are produced. At the same time the cartridge can be opened in a controlled way if correct tools are used, for example for separating the media in the interior from the plastic parts for recycling purposes.

The method according to the invention makes it possible to provide the locking function in a way that is cost effective and does not cause any damage to the media or the other internal parts. If a plurality of punches are used and in a simultaneous action there is no need to realign the cartridge between punches and less resulting force is experienced by the cartridge which means less risk of affecting the carefully packed media bed.

In the following, the invention will be described in more detail, by way of example only, with regard to non-limiting embodiments thereof, reference being made to the accompanying drawings.

BRIEF DESCRIPTION OF THE DRAWINGS

FIG. 3 a-b are schematic illustrations of one of the steps of the method according to the invention.

DETAILED DESCRIPTION

Figure 1:
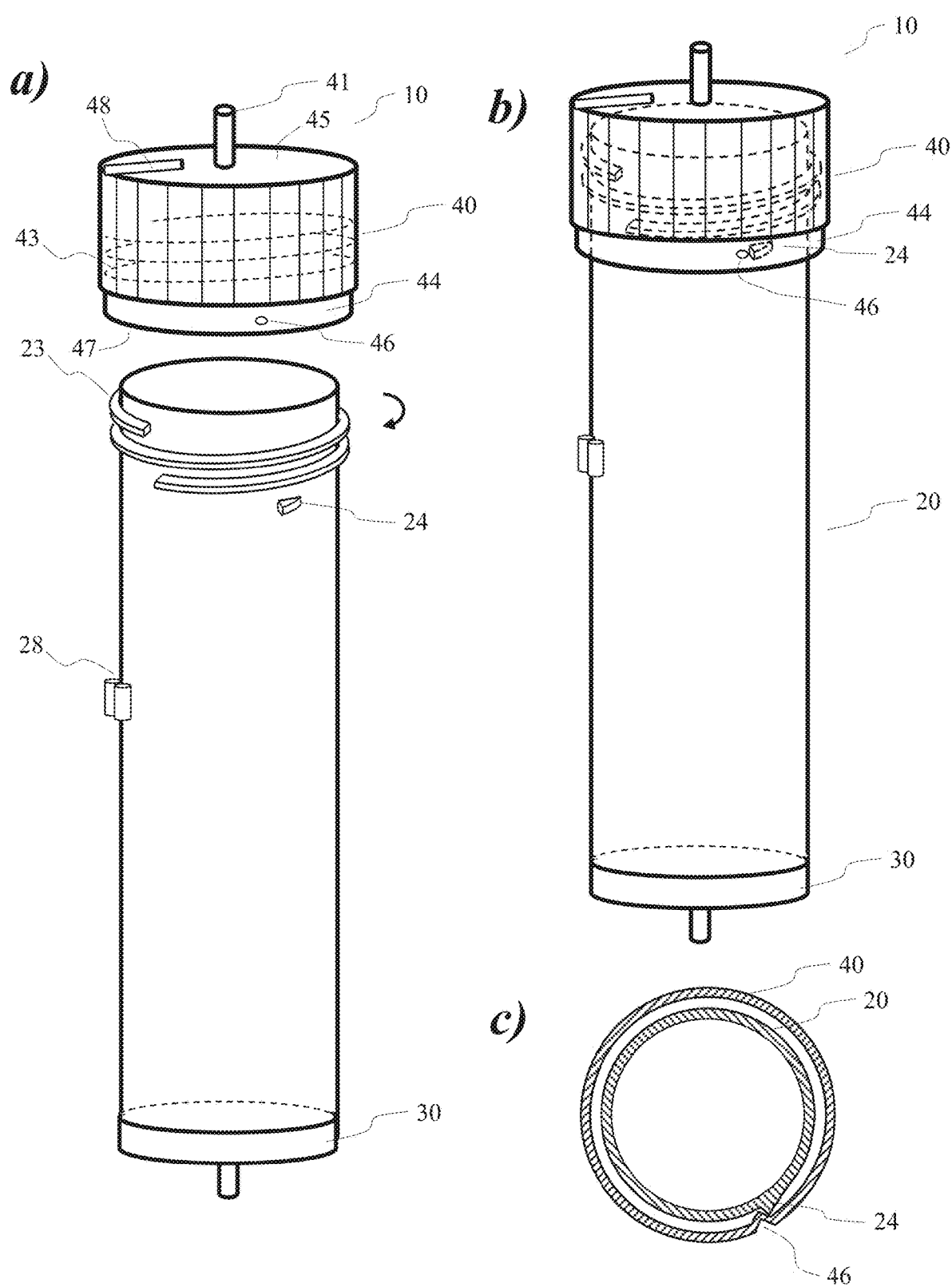
FIG. 1 (a) is a schematic exploded perspective view, (b) is a perspective view of a sealed cartridge, and (c) a cross-sectional view, of an embodiment of the chromatographic cartridge according to the present invention.

Terms such as "top", "bottom", upper", lower", etc are used merely with reference to the geometry of the embodiment of the invention shown in the drawings and are not intended to limit the invention in any manner.

As described in the background section flash chromatography cartridges are typically distributed in a closed pre-packed configuration, although also open cartridges are provided. Open typically meaning that the end user can open a top enclosure of the cartridge and after preparation close the cartridge again. A pre-packed cartridge is typically produced by closing the bottom of the barrel with a bottom cap, mount the interior parts and close with a top cap. Most parts are typically pre-fabricated in automated moulding processes. The production can very simplified be described as a two stage process, wherein in the first stage the plastic parts are fabricated and in the second stage the cartridge is packed and sealed. The second stage is typically more adaptable to various end applications, customer demands etc.

The cartridge 10 according to the present invention is schematically depicted in FIGS. 1*a*-*c*. FIG. 1*a* is an exploded view, 1*b* a close up of the inlet portion of the cartridge 10 and 1*c* a cross-sectional view of the inlet portion of the cartridge 10. The cartridge 10 comprises a barrel 20, typically a cylindrical plastic tube, provided with an outlet end piece 30 arranged to close the barrel 20 and provide an outlet 31 in one in end. A cap 40 is provided with an inlet 41 on its inlet end 45 and arranged at the other end, its open end 47, on the inlet end of the barrel 20. Also the cap 40 and end piece 30 are typically of a plastic material, commonly the same plastic material as the barrel 20. Alternatively the outlet end piece 30 is fully integrated in the barrel 20. As appreciated by the skilled person a cartridge for flash chromatography comprises a number of other functional parts comprised within the cartridge, such as inlet and outlet frits, chromatography medium e.g. silica as well as various support structures. For clarity, these features are not shown. Similarly the cartridge may be provided with support or mounting structures for mounting the cartridge onto or into the chromatography apparatus. Also for clarity, such external structures are not shown or discussed.

According to the invention the inlet end of the barrel 20 that will engage with the cap 40, is provided with a thread 23 on its outer cylindrical surface and adjacent to the inlet end of the barrel 20. The barrel 20 and the cap 40 are provided with matching sealing means (not shown) to seal the cartridge to typically a predetermined pressure specification. The thread 23 is preferably a normal right-hand thread giving a clockwise screw direction indicated with an arrow in FIG. 1*a*. Below the thread 23 in the direction from the inlet end of the barrel 20, is at least one protrusion 24 provided. The protrusion 24 extents from the outer surface of the barrel 20 in an essentially outwards radial direction, preferably with a height of 0.5-5 mm from the surface of the barrel 20. The protrusion 24 of the barrel 20 is adapted to interact with a post-fabricated locking member 46 of the cap 40 to form a mechanical connection. The mechanical connection will after the final assembly of the cartridge, then the locking member 46 of the cap 40 has been provided, prevent the cap 40 from being unscrewed. The locking member 46 may for example be an indent, a melted structure in the flange 44 or added material to the flange 44, which represent different embodiments of the invention. In the following an indent is used as an illustrative example. As appreciated by the skilled person the requirements and characteristics are relevant also for other types of locking members.

According to one embodiment the locking member 46 is a melted structure that has been provided to the cap 40 during the final assembly by localised melting.

As will be further described below, the protrusion 24 should interact with a locking member in the cap 40 to provide a locking function of the cap 40 to the barrel 20. The design of the protrusion 24 can be varied relatively freely as long as the interaction with the locking member of the cap 40 is such that a secure locking is ensured. According to one embodiment the side of the protrusion that faces a direction that is opposite the screw direction is essentially perpendicular to the outer surface of the barrel 20. According to one embodiment the protrusion comprises a flat surface facing a direction that is opposite the screw direction, and forms an angle to the outer surface of the barrel 20 that is less than 90 degrees, so as to form a hooked shaped design.

Sides of the protrusion 24 may be curved or sloped towards the cylindrical surface of the barrel 20. In particular the side of the protrusion 24 facing the screw direction may be sloped to increase the stability of the protrusion.

The cap 40 has a closed end provided with the inlet 41 forming the inlet part of the cartridge 10 and an open end for receiving the barrel 20. The cap 40 is provided with an internal thread 43 matching the thread 23 of the barrel 20. Below the thread 43 of the cap 40, as seen from the inlet end of the cap 40, and adjacent to the open end of the cap (40) is a cylindrical flange 44 arranged, which ends the cap 40 in the open end of the cap 40. The inner diameter of the flange 44 is such that it can accommodate the protrusion or protrusions 24 of the barrel 20 without contacting, or just contacting, the protrusions 24, in order for providing a smooth mounting of the cap 40 onto the barrel 20. A play between the protrusion 24 and the inner surface 45 of the flange 44 up to the order of a few millimetres may be acceptable. The flange (44) has preferably a continuous surface, but may have cut outs. Accommodated should be understood that each protrusion (24) is covered by a flange portion.

The flange 44 of the cap 40 is provided with at least one post-fabricated locking member 46 extending essentially radially inwards from the inner cylindrical surface of the flange 44 of the cap 40. According to one embodiment of the invention the locking member 46 is an indent. The indent 46 extents a distance from the inner surface 46 that substantially exceeds the play, if a play is present. The overlap in the radial direction between the protrusion 24 and the indent 46 may preferably exceed at least a third of the length that the protrusion 24 extends from the outer surface of the barrel (20). As non-limiting examples: for a 200 g size cartridge the indent 46 may be in the order of 2-5 mm and for smaller size cartridges in the order of 1-3 mm. Alternatively one could describe the relation between the protrusion 24 and indent 46 as overlapping in the radial direction of the barrel 20, the overlap being in the order of 1-5 mm.

The indent 46 should be positioned in relation to the protrusion 24 so that the indent 46 is after, and adjacent the protrusion 24 in the screw direction. Preferably the indent 46 abuts the protrusion 24. This gives a secure locking of the cap 40, so it can not be unscrewed from the barrel 20 and no play is present if a user is trying to unscrew the cap 40 from the barrel 20. The position of the indent 46 relative the protrusion 24 should further relate in such a manner that it is in the fully closed position of the cap 40 that the indent 46 should lock the cap. Fully locked should here be understood that the cap is screwed to a predetermined torque providing a leak-proof enclosure.

The term "post-fabricated indent" is used to illustrate that the locking member, for example the indent 46 has been provided in connection with the final assembly of the pre-packed cartridge 10 and after the cap 40 has been screwed onto the barrel 20, it is not a structure given by the moulding process, for example. The indent 24 have typically and preferably been provided to the flange by punching the outer surface of the flange 44 with a punch with a predetermined impact and punching depth in a last, or one of the last steps in finalising the pre-packed cartridge 10. The punching typically results in a local plastic deformation, i.e. non-reversible deformation, of the flange 44. According to one embodiment of invention the indent 46 comprises at least a portion that is plastically deformed.

One purpose of the locking of the cap 40 is to ensure that the cartridge is provided to an end user in an intact condition. This includes hindering a user to unintentionally or purposely open the cartridge. The locked cartridge should therefore withstand a predetermined torque. The predetermined torque should relate to the torque a human using her hands would exert on the cap-barrel, taking into account parameters such as the dimension of the cartridge. A typical torque asserted by a user can range from 3-10 Nm depending of the strength of the user, but also on the shape and in particular, the size, of the cap. According to one embodiment of the invention, the indent 46 and the protrusion 24 interact to withstand a predetermined torque.

As described above the locking provided by the indent 46 and protrusion 24 combination aims to prevent access to the interior of the cartridge 10. However, in some circumstances it is preferred to have access. After use the cartridges should normally be discarded. However, modern re-cycling requirements typically require plastic waste such as the cartridge to be separated from the chemical infused materials from the interior. According to one embodiment of the invention the indent 46 and the protrusion 24 interact to withstand a first predetermined torque, but are arranged to break at a second predetermined torque. The first predetermined torque should relate to a torque typically achievable by human hands, preventing a user to open the cartridge with her bare hands. The second torque should be significantly higher than the first torque but below a torque relating to the cap being opened with the aid of a tool providing a lever or by a machine. Typically and preferably the protrusion 24 has a higher stability than the indent 46, causing the indent 46 to break or the flange 44 to flex outwards if the second predetermined torque is exceeded. The possibility provided by the invention of having a locking mechanism that withstands all normal handling but breaks relatively easily provided the correct opening equipment is used ensures an efficient re-cycling of the cartridge. Applying the second torque should preferably permanently deform the indent 46 and thereby prevent unauthorised re-use of an opened cartridge.

According to one embodiment of the invention the barrel 20 and/or the cap 40 are provided with respective alignment means 28, 48 for facilitating a correct positioning of the punch that forms the indent 46 in relation with the protrusion 24. The alignment means 28, 48 may be visual markings, ridges or knobs, for example. Alternatively the barrel is provided with a support structure with a second purpose of mounting the cartridge to the chromatograph, which support structure in addition is used to position and aligning the barrel 20 in the punching process. Accordingly only the cap 40 needs alignment means 48, for example a visual mark or a knob.

According to one embodiment of the invention the cartridges 20 is provided with a plurality of protrusions 24 and indents 46, arranged pairwise in close proximity to each other. Preferably the number of protrusion/indent pairs is between 2 and 6, and even more preferably 3 or 4. The number of protrusion/indent pairs affect the force exerted on each pair of indent/protrusion if an opening action is performed. The torque and the predetermined first and second torque should be understood as the total torque to withstand or break, respectively, exerted on the cap 40 relative the barrel 20. The skilled person would understand to adapt the design of each pair of protrusion 24 and indent 46 with regards to the chosen number of pairs, or visa versa, in order to adapt to the required torque. The design parameters including, but not limited to: the overlap of the protrusion 24 and indent 46 in the radial direction, the protrusion/indent area and material properties of the protrusion 24 and the indent 46.

The torque may be measured with a torque wrench. Alternatively the torque T is established by measuring the force F acting perpendicular on the Euclidean distance r from the rotation axis. The torque is calculated as, $$\tau = F \times r \quad (1)$$

In the work of establishing first and second predetermined torque, the barrel 20 was fixed and a lever provided with a dynamometer was attached to the cap 40. Table 1 lists torque needed to unscrew the cap 40 from cartridges of different size. These values represent appropriate second predetermined torques for respective sizes. If compared to the torque range of 3-10 nm typical for a human using her bare hands, it should be taken into account that for the small size (5/10 g) it is the lower part of the range that is applicable (around 3 nm), since the cap for such cartridge is small. Preferably the second predetermined torque is 1.3 to 2 times higher than the first predetermined torque. Manual tests with representative test persons confirmed that the persons could not open the cartridges with their hands.

TABLE 1

Torque for different cartridge size

| Cartridge | Torque (Nm) |
|---|---|
| 200/340 g | 18 |
| 50/100 g | 11 |
| 5/10 g | 8 |

The cartridge 10 has above been described with the cap 40 and barrel 20 being joined with a thread. "Thread" should here be interpret to include all types of joining mechanisms that utilizes a twisting or screwing motion, for example bayonet couplings.

Having a cap on the inlet end and an integral end-piece on the outlet end of the chromatography cartridge represents a common version in flash chromatography. Other alternatives could be envisaged, for example having caps in both ends of the barrel which both utilizes the above described locking mechanism. Alternatively a cap is provided only at the outlet end of the cartridge and provided with the locking mechanism. The skilled person would, given the teachings herein, know how to adapt the different parts to function according to the present invention.

The protrusion 24 a hollow structure, for example of the form of a cylinder and the indent 46 positioned so that it extends into the hollow of the protrusion 24—The protrusion 24 may also be realized as two ridges extending in a direction perpendicular to the screw direction and the indent 46 extending in-between the two ridges.

Figure 2:
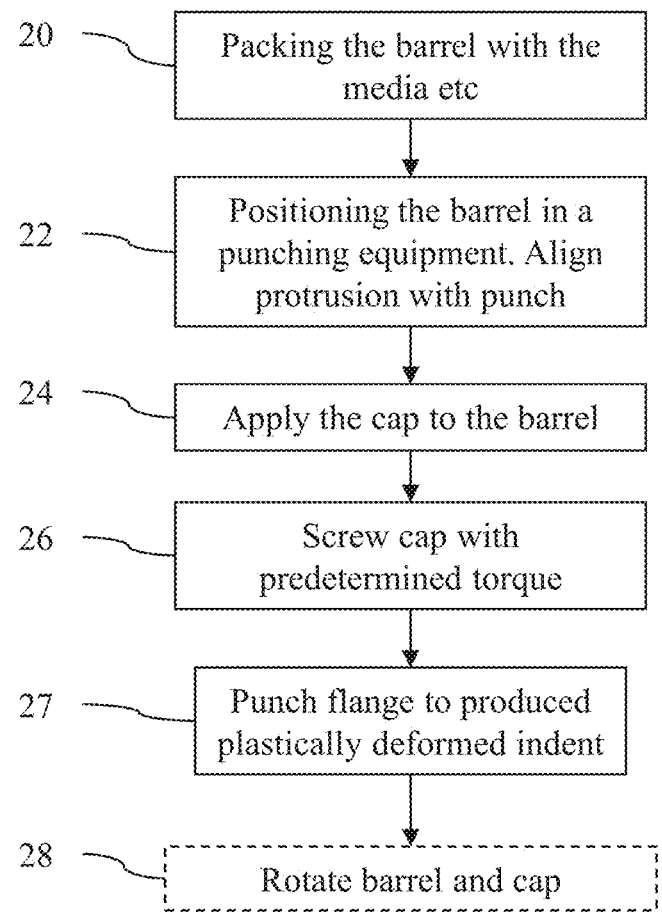
FIG. 2 is a flowchart of the method according to the invention.

The method according to the invention of final assembling of a closed chromatography cartridge with a punching machinery 30, illustrated in the flowchart of FIG. 2 and in the drawings of FIGS. 3a-c, comprises the steps:

20: Providing a barrel packed with chromatography media, internal support structures, frits etc.

22: Positioning the barrel in a punching equipment comprising at least one punch 32 and aligning the protrusion 24 of the barrel 20 so that the punch 32 is positioned a predetermined distances after the protrusion 24 in the screw direction. Positioning and aligning may be done in a single action, for example using the alignment means 28 of the barrel. Alternatively the barrel 20 is first placed in a support 31 and sequentially aligned.

24: Applying the cap 40 to the top of the barrel 20.

26: Screwing the cap 40 with a predetermined torque. If the barrel 20 has been correctly aligned with regards to the punch 32, it is only necessary to ensure that the cartridge 10 is properly closed, since the punches can be placed anywhere on the flange 44 of the cap 40. Alternatively the position is determined by aligning respective alignment means of the cap 40 and the barrel 20 with each other.

27: Punching the flange 44 of the cap 40 with a punch 32 to produce at least one indent 46. The punch 32 is typically and preferably operated by a pneumatic cylinder 33 that can be set to a predetermined punching depth and/or punching force. As can be seen in the schematic illustration of FIG. 3c the punch should hit the flange 44 of the cap 40 so to produce an indent that abuts the protrusion 26. The punch depth should be adjusted so that the punch never touches the outer surface of the barrel 20.

28: In an optional step the cartridge 10 is rotated a with regards to the punch 32 and the punching step 27 is repeated. If more than two indents 46 are to be provided the steps of punching 27 and rotating 28 are repeated.

The predetermined distance in positioning and alignment step 22 should be selected so that the punch 32 will cause an indent 46 of the cap 40 that abuts the protrusion 24 of the barrel 20. Given that requirement the skilled operator may with a limited test series determine a suitable predetermined distance. Similarly, a correct punch depth/force is preferably determined by testing. According to one embodiment of invention the punch depth/force is selected to give an indent 46 that is at least partly plastically deformed.

According to one alternative embodiment the punching step 27 and rotation step 28 is replaced with a single multiple punching step 29. The punching machinery is provided with plurality of punches 32 and respective pneumatic cylinders 33 each producing an indent 46 upon the punching operation. Preferably the punching of the plurality of different punches is simultaneous in order to have a balanced operation. Utilizing a plurality of punches saves time, reduces the need to realign the cartridge between punches and the lesser force exerted on the cartridge due to punch symmetry means less risk of affecting the carefully packed media bed.

If the locking member is a melted structure the punching machinery is replaced with equipment for localized melting, for example pin or tap like resistive heaters or a laser heater. The requirements and procedure regarding alignment will be the same.

Final assembling should here be understood as recognizing that a number of manufacturing steps may have occurred before the cartridge is packed with media and closed. Such manufacturing steps include, but are not limited to, producing the barrel, cap and internal structure and preparing the media. Depending on how the manufacturing process is implemented, the final assembling may comprise more, or fewer, steps than here described. The skilled person would know how to adapt the method according to the invention in order to comply with different manufacturing processes.

The present invention is not limited to the above-described embodiments. Various alternatives, modifications and equivalents may be used. Therefore, the above embodiments should not be taken as limiting the scope of the invention, which is defined by the appending claims.

The invention claimed is:

1. A chromatography cartridge comprising: a barrel having at least one end sealed with a cap, the barrel comprising a thread arranged on the outer cylindrical surface of the barrel and the cap comprising a mating thread on an inner cylindrical surface of the cap, the cap having an inlet end and an open end, wherein:
   the barrel comprises at least one protrusion arranged on the outer cylindrical surface and below the thread of the barrel in the direction from the end sealed by the cap, the protrusion extending essentially radially outwards from the outer cylindrical surface of the barrel; and
   wherein the cap comprises a cylindrical flange arranged below the thread of the cap in the direction from the inlet end of the cap, the flange accommodating the protrusion, and at least one locking member provided on the inner cylindrical surface of the flange and extending essentially radially inwards; and
   wherein the cartridge comprises a mechanical connection formed by the locking member of the cap and the protrusion of the barrel,
   wherein the locking member is an indent in the flange of the cap.

2. The chromatography cartridge according to claim 1, wherein the locking member is a local deformation of the flange and the local deformation has been provided to the flange after the cap has been mounted onto the barrel.

3. The chromatography cartridge according to claim 1, wherein at least a portion of the indent is plastically deformed.

4. The chromatography cartridge according to claim 3, wherein the indent has been formed by a punching operation resulting in the at least partly plastically deformed indent.

5. The chromatography cartridge according to claim 1, wherein an overlap in the radial direction between the protrusion and the indent exceeds one third of the length that the protrusion extends from the outer surface of the barrel.

6. The chromatography cartridge according to claim 5, wherein the indent is arranged after the protrusion in the screw direction and abuts the protrusion.

7. The chromatography cartridge according to claim 2, wherein the locking member is a melted structure in the flange of the cap, wherein the melted structure has been formed by localized melting of a portion of the flange.

8. The chromatography cartridge according to claim 1, wherein the mechanical connection formed by the protrusion and the locking member is arranged to withstand a first predetermined torque and to break at a second predetermined torque, the first and second predetermined torque asserted in the direction opposite to the screw direction.

9. The chromatography cartridge according to claim 8, wherein the first predetermined torque corresponds to a torque achievable by a user using her hands manually unscrewing the cap and the second predetermined torque is in the range 1.3-2 times the first predetermined torque.

10. The chromatography cartridge according to claim 1, wherein a plurality of protrusions and locking members pairs are provided on the barrel and the flange respectively.

11. A method of manufacturing a closed chromatography cartridge according to claim 1, the cartridge comprising at least a barrel, a cap and chromatography media, the cap adapted to be screwed onto the barrel in a predetermined screw direction, the barrel comprising at least one protrusion arranged on the outer cylindrical surface of the barrel and the cap provided with a flange that is adapted to accommodate the protrusion in a mounted position on the barrel, the method comprising the steps of:
   providing a barrel packed with at least chromatography media;
   positioning the barrel in a punching equipment comprising at least one punch and aligning the protrusion of the barrel so that the punch is positioned a predetermined distances after the protrusion in the screw direction;
   applying the cap to the top of the barrel;
   screwing the cap and/or the barrel to a predetermined position and/or with a predetermined torque;
   punching the flange of the cap to produce at least one indent.

12. The method according to claim 11, wherein the positioning step comprises mating alignment means provided on the barrel with corresponding alignment means provided on a support structure of the punching equipment.

13. The method according to claim 12, wherein the barrel is provided with a plurality of protrusions, the method further comprising to, after a first punching step at a first protrusion, rotating the barrel and aligning a second protrusion with regards to the punch and repeating the punching step.

14. The method according to claim 11, wherein the punching step comprises punching with a plurality of punches each producing an indent, and wherein the punching with the plurality of punches is simultaneous in order to have a balanced operation.

15. The method according to claim 11, wherein the punching step produces an at least a partly plastically deformed indent.

* * * * *